US012794273B2

(12) United States Patent
Tsuda et al.

(10) Patent No.: US 12,794,273 B2

(45) Date of Patent: Nov. 10, 2026

(54) POWERED DEVICE, POWER SOURCING EQUIPMENT, AND OPTICAL POWER FEEDING SYSTEM

(71) Applicant: KYOCERA CORPORATION, Kyoto (JP)

(72) Inventors: Shinji Tsuda, Tokyo (JP); Takashi Iwasaki, Tokyo (JP); Yoshiyuki Kimura, Yokohama (JP); Takahiro Ishii, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 169 days.

(21) Appl. No.: 18/871,726

(22) PCT Filed: Jun. 6, 2023

(86) PCT No.: PCT/JP2023/021035

§ 371 (c)(1),
(2) Date: Dec. 4, 2024

(87) PCT Pub. No.: WO2023/238868

PCT Pub. Date: Dec. 14, 2023

(65) Prior Publication Data

US 2025/0350154 A1 Nov. 13, 2025

(30) Foreign Application Priority Data

Jun. 6, 2022 (JP) ................................. 2022-091439

(51) Int. Cl.

*H04B 10/00* (2013.01)
*G02B 27/09* (2006.01)

(Continued)

(52) U.S. Cl.

CPC .......... *H02J 50/30* (2016.02); *G02B 27/0916* (2013.01); *G02B 27/0955* (2013.01); *H02J 50/005* (2020.01); *H02J 50/80* (2016.02)

(58) Field of Classification Search

CPC .... H04B 10/80; H04B 10/806; H04B 10/807; H02J 50/30

See application file for complete search history.

(56) References Cited

U.S. PATENT DOCUMENTS

2016/0049831 A1 2/2016 Nakano et al.
2019/0229558 A1* 7/2019 Pigeon .................... H02J 50/30

(Continued)

FOREIGN PATENT DOCUMENTS

JP 2019-013063 A 1/2019
WO 2014/156465 A1 10/2014

(Continued)

OTHER PUBLICATIONS

De Santi Carlo et al., "GaN-Based Laser Wireless Power Transfer System", Materials, vol. 11, No. 1, Jan. 17, 2018 (Jan. 17, 2018), 153, XP093090613, DOI: 10.3390/ma11010153, 13 pages.

*Primary Examiner* — Daniel G Dobson

(74) *Attorney, Agent, or Firm* — Procopio, Cory, Hargreaves & Savitch LLP

(57) ABSTRACT

To suppress an influence of radiation of feed light subjected to spatial transmission, an optical power feeding system 1B performs power feeding from PSE 110B to a PD 310B by spatial transmission of feed light 112. The PSE 110B includes a light emitter 111 and an adjuster 150B. The light emitter 111 outputs the feed light 112. The adjuster 150B variably adjusts a beam diameter of the feed light 112. The PD 310B includes a light receiver 311 and a responder 350B. The light receiver 311 converts the feed light 112 that has been received into electric power. The responder 350B makes a response to the PSE 110B in accordance with whether the beam diameter of the feed light 112 is appropriate. The adjuster 150B gradually decreases the beam diameter from a beam diameter at a start of outputting of the (Continued)

feed light 112, and stops decreasing the beam diameter, based on the response.

10 Claims, 8 Drawing Sheets

(51) Int. Cl.

| | |
|---|---|
| ***H02J 50/00*** | (2016.01) |
| ***H02J 50/30*** | (2016.01) |
| ***H02J 50/80*** | (2016.01) |
| *H04J 14/00* | (2006.01) |

(56) References Cited

U.S. PATENT DOCUMENTS

| | | | | |
|---|---|---|---|---|
| 2021/0135422 | A1 | 5/2021 | Yokouchi et al. | |
| 2024/0322607 | A1 * | 9/2024 | Nugent, Jr. ............ | B64G 1/443 |

FOREIGN PATENT DOCUMENTS

| | | | |
|---|---|---|---|
| WO | 2020/032148 | A1 | 2/2020 |
| WO | 2020237107 | A1 | 11/2020 |

* cited by examiner

POWERED DEVICE, POWER SOURCING EQUIPMENT, AND OPTICAL POWER FEEDING SYSTEM

TECHNICAL FIELD

The present disclosure relates to a powered device, power sourcing equipment, and an optical power feeding system.

BACKGROUND OF INVENTION

Recently, an optical power feeding system has been studied in which electric power is converted into light (called feed light), the feed light is transmitted and is converted into electric energy, and the electric energy is used as electric power.

In view of a possible damage caused by radiation of high-power feed light onto an external object, an optical power feeding system of the related art provides measures by a configuration below.

That is, the optical power feeding system of the related art has a configuration in which a first reflecting mirror and a second reflecting mirror are disposed at respective ends of an optical fiber, a semiconductor optical amplifier is disposed between the first reflecting mirror and one end of the optical fiber, and a light receiving module is disposed on an outer side relative to the second reflecting mirror (for example, see Patent Literature 1).

In the optical power feeding system described above, the two reflecting mirrors located on the respective sides of the optical fiber and the semiconductor optical amplifier form a laser resonator. The light receiving module receives laser light (feed light) output from the laser resonator and thus converts the laser light into electric energy.

When the optical fiber detaches and the laser light leaks to the outside, resonance can no longer be caused using the first reflecting mirror and the second reflecting mirror. This thus decreases and disables the power of the leaking laser light.

CITATION LIST

Patent Literature

Patent Literature 1: International Publication No. 2020/032148

SUMMARY

Problem to be Solved

Because the use of an optical fiber in an optical power feeding system increases a loss caused in feed light, power feeding by spatial transmission has been studied in recent years.

However, the optical fiber is an essential component of the above-described optical power feeding system of the related art. Thus, the optical power feeding system of the related art has an issue that an influence of radiation of the feed light cannot be suppressed with the optical power feeding system that performs spatial transmission.

The present disclosure suppresses an influence of radiation of feed light subjected to spatial transmission.

Solution to Problem

An optical power feeding system according to the present disclosure is an optical power feeding system that performs power feeding from power sourcing equipment to a powered device by spatial transmission of feed light.

The power sourcing equipment includes a light emitter and an adjuster. The light emitter outputs the feed light. The adjuster variably adjusts a beam diameter of the feed light.

The powered device includes a light receiver and a responder. The light receiver converts the feed light that has been received into electric power. The responder makes a response to the power sourcing equipment in accordance with whether the beam diameter of the feed light is appropriate.

The adjuster gradually decreases the beam diameter from a beam diameter at a start of outputting of the feed light, and stops decreasing the beam diameter, based on the response.

Power sourcing equipment according to the present disclosure is power sourcing equipment that performs power feeding to a powered device by spatial transmission of feed light, and includes a light emitter and an adjuster.

The light emitter outputs the feed light. The adjuster variably adjusts a beam diameter of the feed light.

The adjuster gradually decreases the beam diameter from a beam diameter at a start of outputting of the feed light, and stops decreasing the beam diameter, based on a response obtained in accordance with the beam diameter of the feed light.

A powered device according to the present disclosure is a powered device to which power feeding is performed by spatial transmission of feed light from power sourcing equipment, and includes a light receiver and a responder.

The light receiver converts the feed light that has been received into electric power. The responder makes a response to the power sourcing equipment in accordance with whether a beam diameter of the feed light is appropriate.

The responder makes a response to the power sourcing equipment in accordance with the beam diameter of the feed light, in response to the power sourcing equipment gradually decreasing the beam diameter of the feed light from a beam diameter at a start of outputting.

DESCRIPTION OF EMBODIMENTS

An embodiment of the present disclosure is described below with reference to the drawings.

(1) Overview of System

First Embodiment

Figure 1:
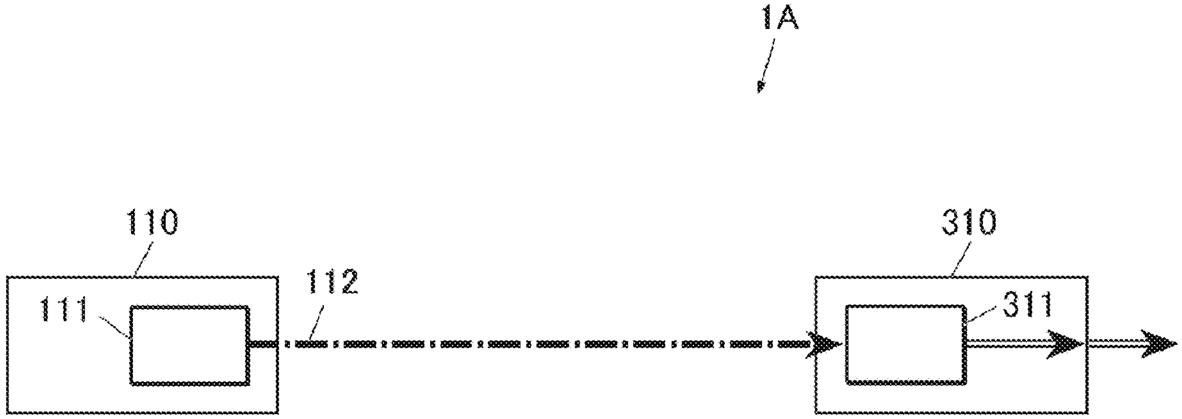
FIG. 1 is a configuration diagram of an optical power feeding system according to a first embodiment of the present disclosure.

As illustrated in FIG. 1, an optical power feeding system 1A according to the present embodiment includes PSE (Power Sourcing Equipment) 110 and a PD (Powered Device) 310.

The PSE 110 converts electric power into optical energy, and supplies the optical energy. The PD 310 receives the supplied optical energy, and converts the optical energy into electric power.

To cope with an energy loss due to transmission through an optical fiber, the optical power feeding system 1A performs power feeding from the PSE 110 to the PD 310 by spatial transmission of feed light. Such an optical power feeding method is called PoA (Power over Air). Note that the spatial transmission herein indicates that feed light is transmitted with no optical fiber being arranged but only a space being present in a spatial transmission section between the PSE 110 and the PD 310. In this case, the space may be a vacuum, or air or another gas may be present in the space. Each embodiment described below exemplifies a case where the atmosphere is present between the PSE 110 and the PD 310 unless otherwise noted.

The entire transmission path of feed light 112 between the PSE 110 and the PD 310 need not be the spatial transmission section. For example, a part of the transmission path may be formed by an optical fiber, and the remaining part may be a spatial transmission path. However, each embodiment described below exemplifies a case where the entire transmission path of the feed light between the power sourcing equipment and the powered device is the spatial transmission section unless otherwise noted.

The transmission path of the feed light between the PSE 110 and the PD 310 may be provided with a partition wall, a protective fence, or the like that isolates the transmission path from the surroundings. However, each embodiment described below exemplifies a case where the partition wall, the protective fence, or the like is not provided unless otherwise noted.

The PSE 110 includes a semiconductor laser 111 for power feeding that serves as a light emitter.

The PSE 110 is connected to a power source, and the semiconductor laser 111 for power feeding and so on are electrically driven.

The semiconductor laser 111 for power feeding uses electric power from the power source to perform laser oscillation and output the feed light 112.

The feed light 112 from the PSE 110 propagates in the air, and is input to the PD 310.

The PD 310 includes a photoelectric conversion element 311 that serves as a light receiver.

The photoelectric conversion element 311 converts the feed light 112 transmitted in the air into electric power. The electric power obtained by the photoelectric conversion element 311 through the conversion is used as driving electric power needed in the PD 310. The PD 310 can also output, for an external device, the electric power obtained by the photoelectric conversion element 311 through the conversion.

Semiconductor materials of semiconductor regions that exhibit a light-electricity conversion effect of the semiconductor laser 111 for power feeding and the photoelectric conversion element 311 are semiconductors having a short laser wavelength of 500 nm or shorter.

The semiconductors having a short laser wavelength have a large band gap and a high photoelectric conversion efficiency. Thus, the photoelectric conversion efficiency on the power-generating side and the powered side of optical power feeding increases, and consequently the optical power feeding efficiency increases.

Therefore, the semiconductor materials to be used may be, for example, semiconductor materials that are laser media of a laser wavelength (fundamental wave) of 200 to 500 nm such as diamond, gallium oxide, aluminum nitride, and gallium nitride.

The semiconductor materials to be used may be semiconductors having a band gap of 2.4 eV or greater.

For example, semiconductor materials that are laser media of a band gap of 2.4 to 6.2 eV such as diamond, gallium oxide, aluminum nitride, and gallium nitride may be used.

Laser light of a longer wavelength tends to have a higher transmission efficiency. Laser light of a shorter wavelength tends to have a higher photoelectric conversion efficiency. Thus, for long-distance transmission, a semiconductor material that is a laser medium of a laser wavelength (fundamental wave) longer than 500 nm may be used. When the photoelectric conversion efficiency is prioritized, a semiconductor material that is a laser medium of a laser wavelength (fundamental wave) shorter than 200 nm may be used.

These semiconductor materials may be used in either the semiconductor laser 111 for power feeding or the photoelectric conversion element 311. The photoelectric conversion efficiency increases on the power-sourcing side or the powered side, and consequently the optical power feeding efficiency increases.

As described above, the optical power feeding system 1A transmits the feed light 112 in the space instead of using an optical fiber as the transmission path of the feed light 112. In general, the loss is about 30 [dB/km] when an optical fiber is used as the transmission path of the feed light 112. In contrast, the loss can be decreased to about 1 [dB/km] in spatial transmission.

When the semiconductor material of the semiconductor region that exhibits a light-electricity conversion effect of the semiconductor laser 111 for power feeding is a semiconductor having a short laser wavelength of 500 nm or shorter, more specifically, when a semiconductor material that is a laser medium of a laser wavelength (fundamental wave) of 200 to 500 nm such as diamond, gallium oxide, aluminum nitride, or gallium nitride is used, the loss due to the optical fiber tends to occur in accordance with the length of the transmission distance, whereas the loss can be markedly decreased in spatial transmission.

The optical power feeding system 1A performs spatial transmission using a space instead of using an optical fiber as the transmission path of the feed light 112. Since no limitation of handling power defined for the optical fiber is applied, the feed light 112 can be output with a large output and larger electric power can be supplied via the PD 310.

Second Embodiment

Figure 2:
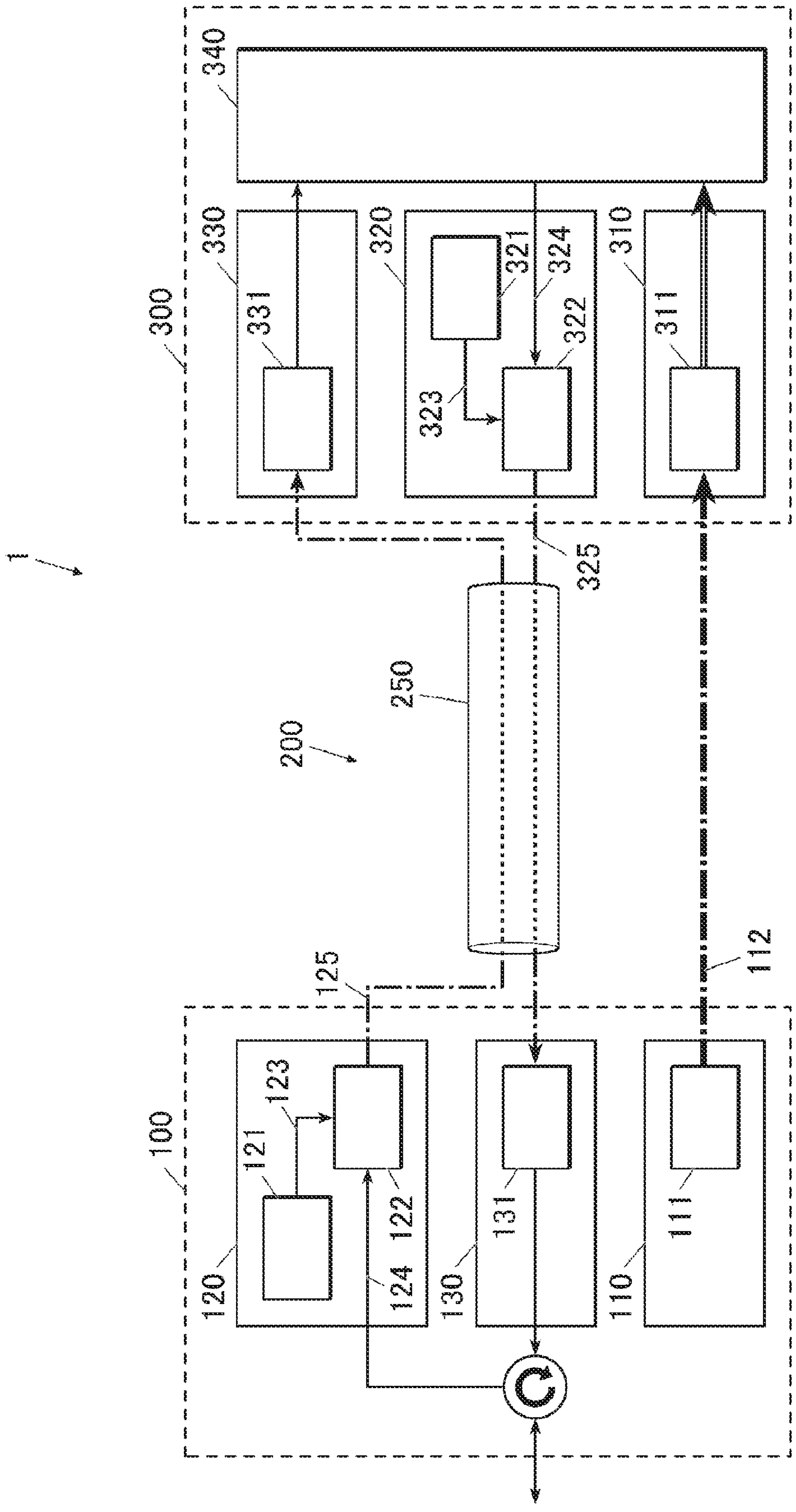
FIG. 2 is a configuration diagram of an optical power feeding system according to a second embodiment of the present disclosure.

As illustrated in FIG. 2, an optical power feeding system 1 of the present embodiment includes a PoA (Power over Air) system that performs spatial transmission and an optical communication system. The optical power feeding system 1 includes a first data communication apparatus 100 including the PSE (Power Sourcing Equipment) 110, an optical fiber cable 200, and a second data communication apparatus 300 including the PD (Powered Device) 310.

The PSE 110 includes the semiconductor laser 111 for power feeding. The first data communication apparatus 100 includes, in addition to the PSE 110, a transmitter 120 and a receiver 130 that perform data communication. The first data communication apparatus 100 corresponds to DTE (Data Terminal Equipment), a repeater, or the like. The transmitter 120 includes a semiconductor laser 121 for signals and a modulator 122. The receiver 130 includes a photodiode 131 for signals.

The optical fiber cable 200 includes an optical fiber 250 that forms a channel of signal light.

The PD 310 includes the photoelectric conversion element 311. The second data communication apparatus 300 includes, in addition to the PD 310, a transmitter 320, a receiver 330, and a data processing unit 340. The second data communication apparatus 300 corresponds to a power end station or the like. The transmitter 320 includes a semiconductor laser 321 for signals and a modulator 322. The receiver 330 includes a photodiode 331 for signals. The data processing unit 340 processes a received signal. The second data communication apparatus 300 is a node in a power feeding network. Alternatively, the second data communication apparatus 300 may be a node that communicates with another node.

The first data communication apparatus 100 is connected to a power source, and the semiconductor laser 111 for power feeding, the semiconductor laser 121 for signals, the modulator 122, the photodiode 131 for signals, and so on are electrically driven. The first data communication apparatus 100 is a node in the power feeding network. Alternatively, the first data communication apparatus 100 may be a node that communicates with another node.

The semiconductor laser 111 for power feeding uses electric power from the power source to perform laser oscillation and output the feed light 112.

The photoelectric conversion element 311 converts the feed light 112 subjected to spatial transmission into electric power. The electric power obtained by the photoelectric conversion element 311 through the conversion is used as driving electric power for the transmitter 320, the receiver 330, and the data processing unit 340 and as other driving electric power needed in the second data communication apparatus 300. The second data communication apparatus 300 may also output, for an external device, the electric power obtained by the photoelectric conversion element 311 through the conversion.

On the other hand, the modulator 122 of the transmitter 120 modulates, based on transmission data 124, laser light 123 output from the semiconductor laser 121 for signals into signal light 125, and outputs the signal light 125.

The photodiode 331 for signals of the receiver 330 demodulates the signal light 125 transmitted through the optical fiber cable 200 into an electric signal, and outputs the electric signal to the data processing unit 340. The data processing unit 340 transmits data based on the electric signal to a node. On the other hand, the data processing unit 340 receives data from the node, and outputs the data as transmission data 324 to the modulator 322.

The modulator 322 of the transmitter 320 modulates, based on the transmission data 324, laser light 323 output from the semiconductor laser 321 for signals into signal light 325, and outputs the signal light 325.

The photodiode 131 for signals of the receiver 130 demodulates the signal light 325 transmitted through the optical fiber cable 200 into an electric signal, and outputs the electric signal. Data based on the electric signal is transmitted to a node. On the other hand, data from the node is treated as the transmission data 124.

(2) Employment of Configuration for Optimizing Beam Diameter of Feed Light

An optical power feeding system that employs a configuration for optimizing a beam diameter of the feed light 112 is described.

In each embodiment described below, the same components as those in the first embodiment or the second embodiment are denoted by the same reference signs, and redundant description thereof is omitted.

Third Embodiment

Figure 3:
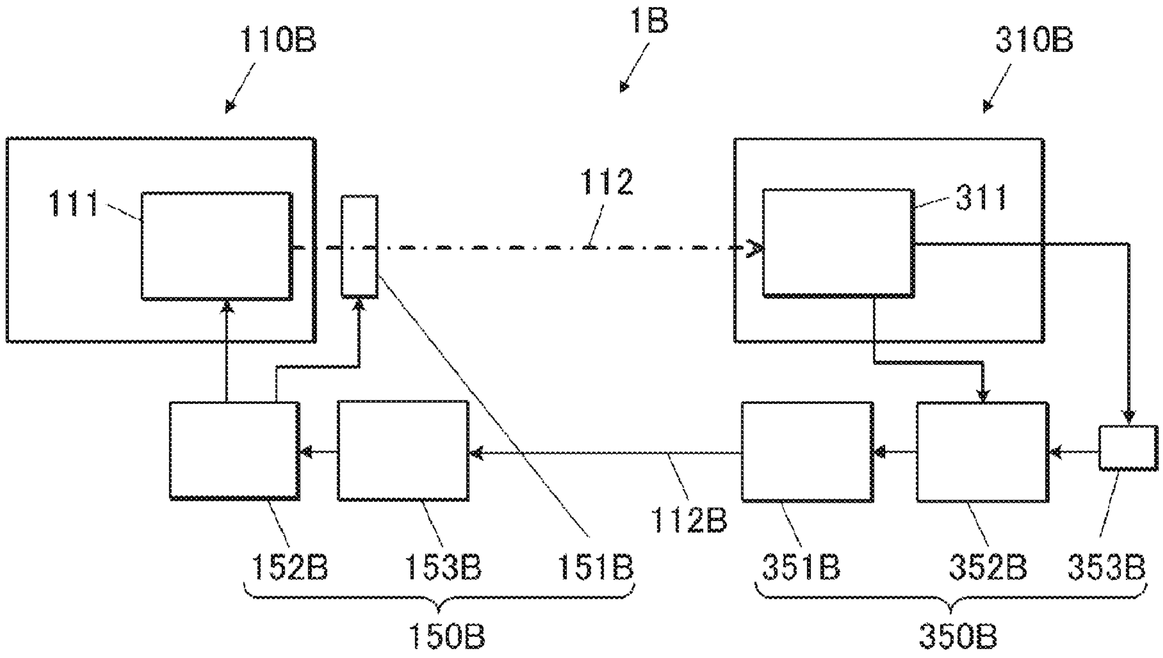
FIG. 3 is a configuration diagram of an optical power feeding system according to a third embodiment of the present disclosure.

FIG. 3 is a configuration diagram illustrating an optical power feeding system 1B according to a third embodiment that employs a configuration for optimizing the beam diameter of the feed light 112.

The optical power feeding system 1B of the third embodiment includes PSE 110B and a PD 310B.

The PSE 110B includes the semiconductor laser 111 for power feeding and an adjuster 150B that variably adjusts the beam diameter of the feed light 112.

The PD 310B includes the photoelectric conversion element 311 and a responder 350B that makes a response to the PSE 110B in accordance with whether the beam diameter of the feed light 112 is appropriate.

The adjuster 150B includes an optical element 151B that makes the beam diameter of the feed light 112 from the semiconductor laser 111 for power feeding variable, a control device 152B that controls the optical element 151B, and a response receiver 153B that receives a response indicating the appropriate state of the beam diameter from the responder 350B of the PD 310B.

The optical element 151B includes, for example, a beam expander or a variable focus lens. The optical element 151B includes multiple lenses arranged along an optical axis of the feed light 112, and an actuator for moving some of the lenses in a direction of the optical axis.

By controlling the positions, in the direction of the optical axis, of the lenses movable by the actuator, the beam diameter of the feed light 112 can be adjusted in any manner.

The actuator to be used may be an actuator whose operation amount is controllable in any manner based on a control command from outside, for example, a stepping motor or a voice coil motor.

The adjuster 150B may include a collimator lens, and may collimate the feed light 112 to be output and adjust the beam diameter of the feed light 112 that is the collimated light.

The control device 152B controls the semiconductor laser 111 for power feeding and the optical element 151B. The control device 152B can perform an operation for causing the semiconductor laser 111 for power feeding to output and stop the feed light 112, and adjust the beam diameter of the feed light 112 with the optical element 151B.

Note that the control device 152B described above may include a microcomputer, or a sequencer using an analog circuit or a digital circuit.

The response receiver 153B includes, for example, a photodiode. The response receiver 153B receives signal light 112B that is a response from the responder 350B of the PD 310B, demodulates the signal light 112B into an electric signal, and outputs the electric signal to the control device 152B.

Note that the signal light 112B from the responder 350B of the PD 310B may be a notification of an abnormal light receiving state of the feed light 112 and a notification of resume permission from a stopped state of the feed light 112 as well as a response indicating the appropriate state of the beam diameter. These are described later.

The responder 350B includes a semiconductor laser 351B for signals that outputs laser light that serves as the signal light 112B, a control device 352B that causes the semiconductor laser 351B for signals to output the signal light 112B in accordance with a predetermined condition, and a backup power source 353B.

The control device 352B monitors electric power output from the photoelectric conversion element 311 upon reception of the feed light 112 to determine whether the beam diameter of the feed light 112 is appropriate and whether the light receiving state is abnormal.

Based on each of the determined results, the control device 352B performs control to cause the semiconductor laser 351B for signals to output the signal light 112B as the response indicating the appropriate state of the beam diameter or the notification of the abnormal light receiving state of the feed light 112.

Note that the control device 352B described above may include a microcomputer, or a sequencer using an analog circuit or a digital circuit.

The backup power source 353B is a power source that allows the semiconductor laser 351B for signals to output the signal light 112B as the notification of the abnormal the light receiving state of the feed light 112 when an abnormality occurs in the light receiving state of the feed light 112.

When an abnormality occurs in the light receiving state of the feed light 112, electric power that allows the semiconductor laser 351B for signals to output the signal light 112B may fail to be obtained from the feed light 112. In such a case, the backup power source 353B supplies electric power.

The backup power source 353B may be a primary battery, a secondary battery, or a capacitor. When the backup power source 353B is a secondary battery or a capacitor, the backup power source 353B may be charged upon reception of the feed light 112.

Figure 4A:
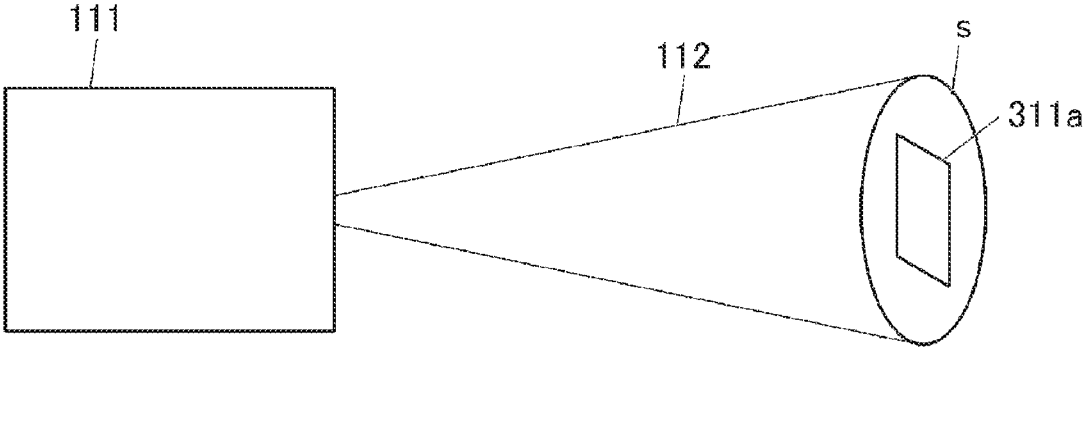
FIG. 4A is an explanatory diagram illustrating feed light with a too large beam diameter.
Figure 4B:
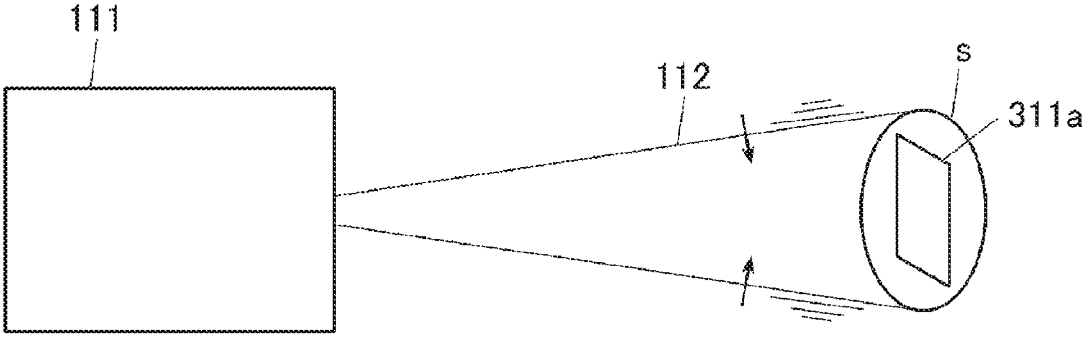
FIG. 4B is an explanatory diagram illustrating feed light with a too large beam diameter.
Figure 4C:
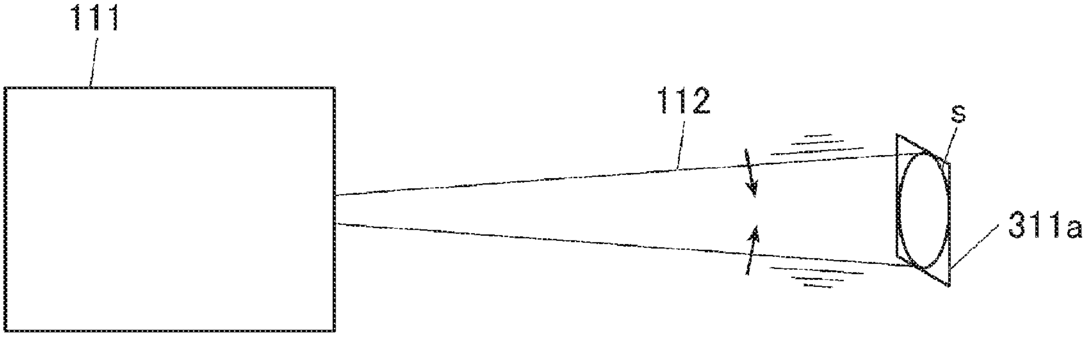
FIG. 4C is an explanatory diagram illustrating feed light with an appropriate beam diameter.

FIGS. 4A to 4C are explanatory diagrams illustrating an appropriate value of a beam diameter s of the feed light 112.

The semiconductor laser 111 for power feeding emits the feed light 112 at a constant output. As illustrated in FIG. 4A and FIG. 4B, when the beam diameter s of the feed light 112 at the photoelectric conversion element 311 of the PD 310B is larger than a light receiving surface 311*a* of the photoelectric conversion element 311 of the PD 310B, part of the feed light 112 is not converted into electric power. Thus, the optical power feeding efficiency decreases.

In contrast, when the beam diameter s of the feed light 112 is smaller than the light receiving surface 311*a* of the photoelectric conversion element 311, the entire feed light 112 can be converted into electric power.

As the beam diameter s of the feed light 112 decreases, the energy density in a radiation range increases. Thus, when a foreign matter (object) enters the radiation range of the feed light 112, an irradiated portion may be damaged because of heat generation.

Therefore, the beam diameter s of the feed light 112 is adjusted to a maximum diameter that fits within a range of the light receiving surface 311*a* of the photoelectric conversion element 311 as illustrated in FIG. 4C. This can maintain high optical power feeding efficiency and suppress an influence on a foreign matter. That is, as for the beam diameter s of the feed light 112 in FIG. 4C, the maximum diameter that fits within the range of the light receiving surface 311*a* of the photoelectric conversion element 311 can be said to be the appropriate value.

Figure 5A:
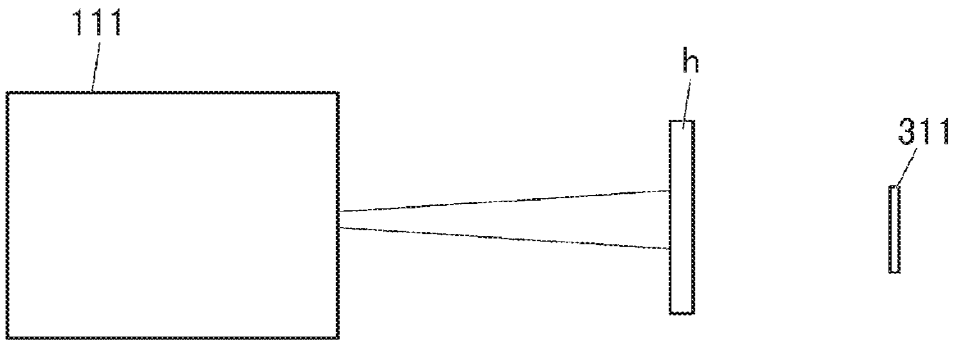
FIG. 5A is an explanatory diagram illustrating a pattern of an abnormal light receiving state of feed light.
Figure 5B:
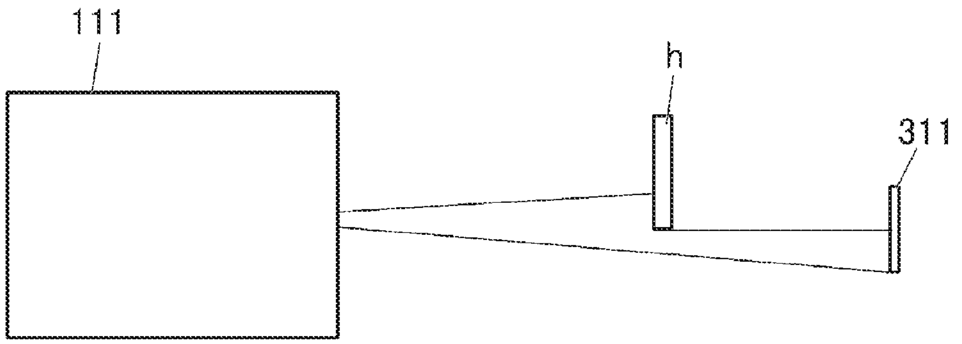
FIG. 5B is an explanatory diagram illustrating another pattern of the abnormal light receiving state of the feed light.

FIGS. 5A and 5B are explanatory diagrams illustrating patterns of the abnormal light receiving state of the feed light 112.

When a foreign matter h enters a path of the feed light 112 in the space from the semiconductor laser 111 for power feeding of the PSE 110B to the photoelectric conversion element 311 of the PD 310B, the output of the photoelectric conversion element 311 greatly decreases because the feed light 112 is completely blocked as illustrated in FIG. 5A or part of the feed light 112 is shielded as illustrated in FIG. 5B.

Thus, after the start of power feeding, the control device 152B of the responder 350B of the PD 310B monitors the output of the photoelectric conversion element 311 to determine the occurrence of the abnormal light receiving state of the feed light 112 illustrated in FIGS. 5A and 5B.

Note that the control device 152B may set a threshold for the output of the photoelectric conversion elements 311, and determine that an abnormality has occurred in the light receiving state upon the output falling below the threshold. Alternatively, the control device 152B may set a threshold for the magnitude of a decrease rate in the output of the photoelectric conversion element 311, and determine that an abnormality has occurred in the light receiving state upon the decrease rate in the output of the photoelectric conversion elements 311 exceeding the threshold.

Figure 6:
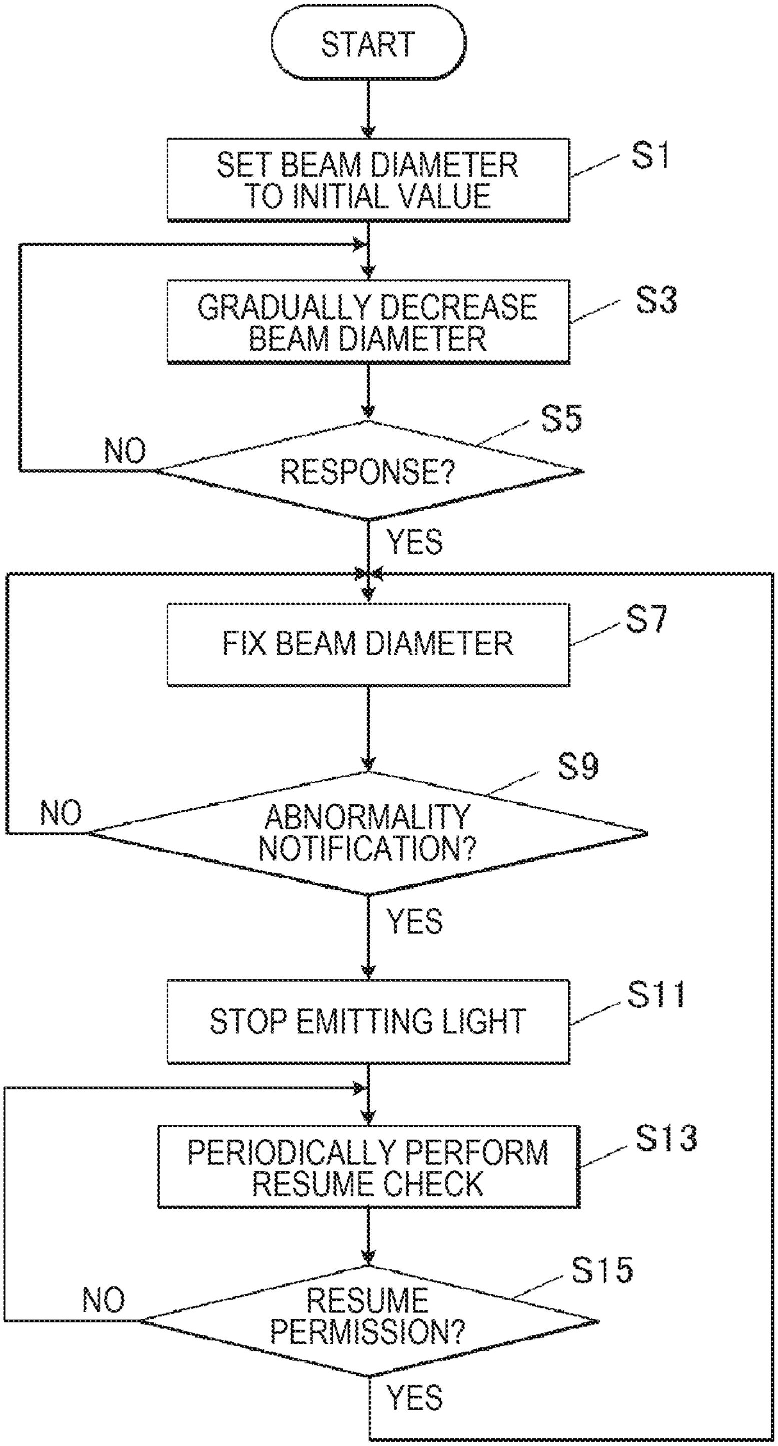
FIG. 6 is a flowchart illustrating output control of feed light performed by a control device of an adjuster.

FIG. 6 is a flowchart illustrating output control of the feed light 112 performed by the control device 152B of the adjuster 150B.

With reference to FIGS. 4A to 6, details of the control performed by the control device 152B of the adjuster 150B and the corresponding control performed by the control device 352B of the responder 350B is described.

First, the control device 152B of the adjuster 150B controls the optical element 151B of the adjuster 150B to make the beam diameter be an initial value that is obviously larger than the light receiving surface 311*a* of the photoelectric conversion element 311, and starts outputting the feed light 112 (step S1).

When the vertical and horizontal widths of the light receiving surface 311*a* of the photoelectric conversion element 311 are known, a value larger than both of the vertical and horizontal widths is registered as the initial value in the control device 152B. When the vertical and horizontal widths of the light receiving surface 311*a* are unknown, a value larger than a value which the photoelectric conversion element 311 of the PD 310B can take within the range of the common technical knowledge is registered as the initial value in the control device 152B.

Along with the start of radiation of the feed light 112, the control device 152B controls the optical element 151B to gradually decrease the beam diameter of the feed light 112 (step S3).

At this time, as illustrated in FIG. 4A, the feed light 112 is also radiated to an area outside the light receiving surface 311*a* of the photoelectric conversion element 311 in the PD 310B. Thus, an amount of electric power output from the photoelectric conversion element 311 is smaller relative to the output of the feed light 112.

As illustrated in FIG. 4B, as the beam diameter of the feed light 112 is gradually decreased, the density of the feed light 112 on the light receiving surface 311*a* gradually increases. Thus, the amount of electric power output from the photoelectric conversion element 311 gradually increases.

Upon the photoelectric conversion element 311 starting receiving the feed light 112, the control device 352B of the responder 350B is supplied with electric power and monitors a change in electric power output by the photoelectric conversion element 311 from the start of receiving the feed light 112.

When the beam diameter of the feed light 112 reaches a size that fits within the range of the light receiving surface 311*a* (the above-described appropriate value of the beam diameter of the feed light 112) as illustrated in FIG. 4C in the process of gradually decreasing the beam diameter of the feed light 112, the electric power output by the photoelectric conversion element 311 stops gradual increase and becomes constant.

Upon detecting the stop of the gradual increase in electric power output by the photoelectric conversion element 311, the control device 352B of the responder 350B recognizes that the beam diameter of the feed light 112 has reached the size that fits within the range of the light receiving surface 311*a*, and controls the semiconductor laser 351B for signals to output the signal light 112B as the response indicating the appropriate state of the beam diameter.

After starting decreasing the beam diameter of the feed light 112, the control device 152B of the adjuster 150B monitors whether the response receiver 153B receives the signal light 112B from the responder 350B (step S5).

If reception of the signal light 112B is not detected, the control device 152B continues decreasing the beam diameter of the feed light 112. If reception of the signal light 112B is detected, the beam diameter of the feed light 112 is recognized to have reached the appropriate value. Thus, the control device 152B stops decreasing the beam diameter of the feed light 112 with the optical element 151B and maintains the beam diameter at the appropriate value (step S7).

After outputting the signal light 112B as the response indicating the appropriate state of the beam diameter, the control device 352B of the responder 350B monitors, using the electric power output by the photoelectric conversion element 311, the occurrence of a decrease or rapid decrease in electric power caused by the foreign matter h blocking the feed light 112 as illustrated in FIG. 5A or by the foreign matter h partially shielding of the feed light 112 as illustrated in FIG. 5B.

Upon detecting the occurrence of a decrease or rapid decrease in electric power, the control device 352B of the responder 350B causes the semiconductor laser 351B for signals to output the signal light 112B as the notification of the abnormal light receiving state of the feed light 112.

On the other hand, after performing control to maintain the beam diameter of the feed light 112 at the appropriate value, the control device 152B of the adjuster 150B monitors again whether the response receiver 153B receives the signal light 112B from the responder 350B (step S9).

If reception of the signal light 112B is detected again, the occurrence of the abnormal light receiving state of the feed light 112 is recognized, and the control device 152B causes the semiconductor laser 111 for power feeding to stop outputting the feed light 112 (step S11).

Thereafter, to check whether power feeding can be resumed, the control device 152B of the adjuster 150B periodically causes the semiconductor laser 111 for power feeding to output the feed light 112 for a short time (step S13).

On the other hand, the control device 352B of the responder 350B loses the power source because power feeding using the feed light 112 is stopped. Thus, the control device 352B uses electric power supplied from the backup power source 353B to monitor the presence or absence of electric power resulting from reception of the feed light 112 by the photoelectric conversion element 311.

If the abnormal light receiving state, such as the foreign matter h blocking the feed light 112 illustrated in FIG. 5A or the foreign matter h partially shielding the feed light 112 illustrated in FIG. 5B, is resolved at this time point, the feed light 112 for checking whether power feeding can be resumed is received and constant electric power is detected from the photoelectric conversion element 311.

Thus, the control device 352B of the responder 350B can recognize that the abnormal light receiving state of the feed light 112 is resolved, and causes the semiconductor laser 351B for signals to output the signal light 112B as the notification of resume permission.

On the other hand, the control device 152B of the adjuster 150B monitors whether the response receiver 153B receives the signal light 112B from the responder 350B every time the control device 152B causes the feed light 112 for checking whether power feeding can be resumed to be output (step S15).

If the signal light 112B is not received from the responder 350B, the process returns to step S13, in which the feed light 112 for checking whether power feeding can be resumed is output.

If reception of the signal light 112B from the responder 350B is detected, the process returns to step S7, in which output of the feed light 112 is resumed with the above-described appropriate value of the beam diameter.

As described above, the optical power feeding system 1B performs control in which the beam diameter of the feed light 112 is gradually decreased by the optical element 151B of the adjuster 150B from the beam diameter at the start of outputting of the feed light 112 and the decrease is stopped based on the signal light 112B that serves as a response obtained in accordance with whether the beam diameter of the feed light 112 is appropriate.

Thus, the beam diameter of the feed light 112 can be optimized, and the influence on the foreign matter h that has entered the radiation range of the feed light 112 can be decreased or suppressed while high optical power feeding efficiency is maintained.

In the optical power feeding system 1B, since the PD 310B includes the responder 350B that makes a response in accordance with whether the beam diameter of the feed light 112 is appropriate, the PD 310B can determine whether the beam diameter is appropriate. This allows the beam diameter of the feed light 112 to be monitored easily and allows the beam diameter of the feed light 112 to be optimized more favorably.

In particular, since the responder 350B makes a response based on an output of the photoelectric conversion element 311, whether the beam diameter of the feed light 112 is appropriate can be detected using an existing configuration. This omits the necessity of a dedicated detection device, and thus can decrease the cost as a result of the decreased number of components and effectively use the device resources.

In the optical power feeding system 1B, the PD 310B includes the responder 350B that functions as a notifier that notifies the PSE 110B of the abnormal light receiving state of the feed light 112 in the photoelectric conversion element 311, and the PSE 110B stops outputting the feed light 112 in response to the notification. Therefore, when the cause of the abnormal light receiving state is the foreign matter h that has entered the radiation range of the feed light 112, radiation of the feed light 112 onto the foreign matter h can be quickly stopped. In this case, the influence on the foreign matter h that has entered the radiation range of the feed light 112 can also be decreased or suppressed.

In the optical power feeding system 1B of the third embodiment, the signal light 112B for the response, the abnormality notification, and the resume permission is transmitted between the adjuster 150B and the responder 350B by spatial transmission, for example. However, the signal light 112B may be transmitted using an optical fiber.

The response, the abnormality notification, and the resume permission notification between the adjuster 150B and the responder 350B is not limited to the optical signal, and may be transmitted by wireless communication using radio waves or wired communication using electric signals.

Fourth Embodiment

Figure 7:
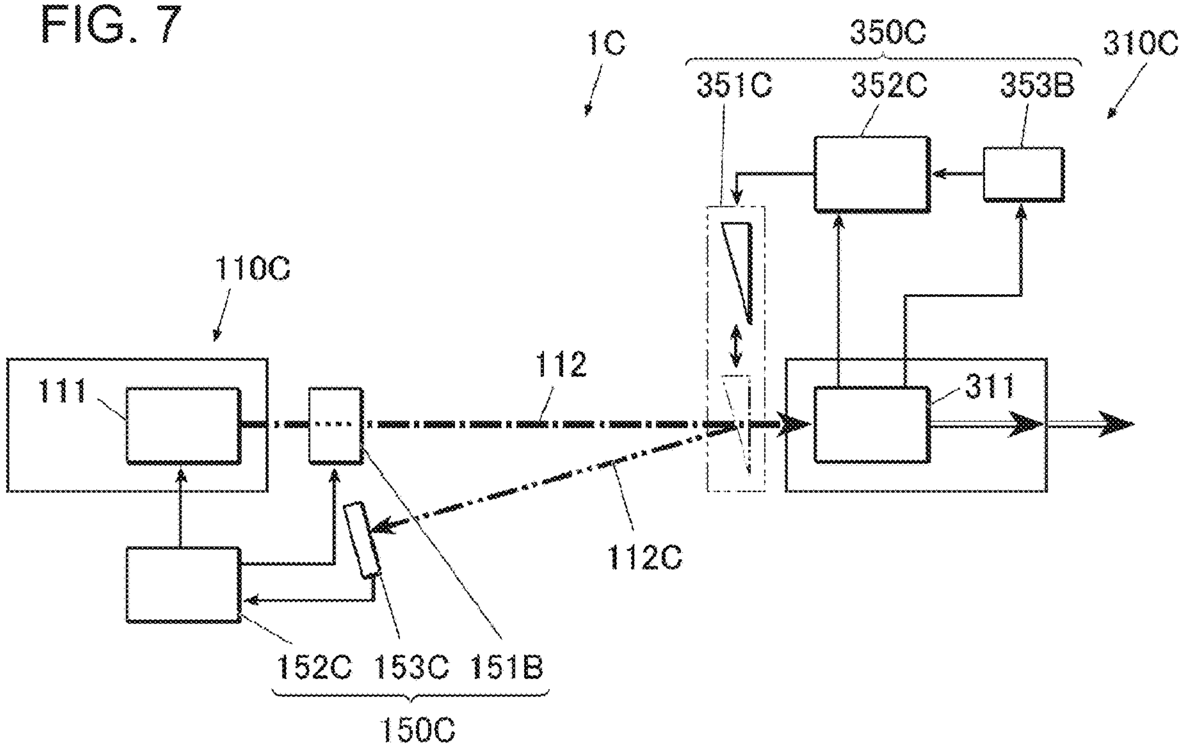
FIG. 7 is a configuration diagram of an optical power feeding system according to a fourth embodiment of the present disclosure.

FIG. 7 is a configuration diagram illustrating an optical power feeding system 1C according to a fourth embodiment that employs a configuration for optimizing the beam diameter of the feed light 112. In the fourth embodiment, the same components as those of the other embodiments already described are denoted by the same reference sings, and redundant description thereof is omitted.

The optical power feeding system 1C includes PSE 110C and a PD 310C.

The PSE 110C includes the semiconductor laser 111 for power feeding, and an adjuster 150C that variably adjusts the beam diameter of the feed light.

The PD 310C includes the photoelectric conversion element 311, and a responder 350C that makes a response to the PSE 110C in accordance with whether the beam diameter of the feed light 112 is appropriate.

The adjuster 150C includes the optical element 151B that makes the beam diameter of the feed light 112 from the semiconductor laser 111 for power feeding variable, a control device 152C that controls the optical element 151B, and a response receiver 153C that receives a response or a notification from the responder 350C of the PD 310C.

The response from the responder 350C of the PD 310C is made using signal light 112C that is reflected light of the feed light 112. Therefore, the response receiver 153C of the adjuster 150C includes a photoelectric conversion element or a photodiode that receives the signal light 112C and inputs a detected signal to the control device 152C.

The control device 152C controls the semiconductor laser 111 for power feeding and the adjuster 150B. Control which the control device 152C performs on these components and the processing which the control device 152C performs when the response receiver 153C receives the signal light 112C are the same as those of the control device 152B described above.

The control device 152C may also include a microcomputer, or a sequencer using an analog circuit or a digital circuit.

The responder 350C includes a reflecting device 351C including a movable reflector that reflects the feed light 112 toward the response receiver 153C of the adjuster 150C, a control device 352C that controls the reflecting device 351C, and the backup power source 353B.

The control device 352C determines whether the beam diameter of the feed light 112 is appropriate and determines the abnormal light receiving state, using the same method as that of the control device 352B described above.

The control device 352C may also include a microcomputer, or a sequencer using an analog circuit or a digital circuit.

The reflecting device 351C is disposed in front of the light receiving surface 311*a* of the photoelectric conversion element 311 and supports the reflector to be movable between a reflection position inside the transmission path of the feed light 112 and a retracted position outside the transmission path.

The reflecting device 351C includes an actuator that moves the reflector between the two positions. The control device 352C performs control for moving the reflector to each of the positions.

The reflector at the reflection position can reflect the feed light 112 from the PSE 110C toward the response receiver 153C of the adjuster 150C, and can transmit, to the adjuster 150C, the signal light 112C that is reflected light.

With the configuration described above, the responder 350C also functions as a notifier that notifies the PSE 110C of the abnormal light receiving state of the feed light 112.

With the configuration described above, the optical power feeding system 1C can perform the same control as the output control of the feed light 112 illustrated in FIG. 6 performed by the control device 152B of the adjuster 150B of the optical power feeding system 1B.

However, when the abnormal light receiving state occurs in which the feed light 112 is completely blocked as illustrated in FIG. 5A, the signal light 112C that is reflected light of the feed light 112 cannot be transmitted (the signal light 112C can be transmitted in the abnormal light receiving state illustrated in FIG. 5B). Therefore, in the output control of the feed light 112 in the optical power feeding system 1C, the processing in and after step S9 in FIG. 6 may be omitted.

With the configuration described above, the optical power feeding system 1C has the same technical effect as the optical power feeding system 1B, and a configuration for performing communication, such as a semiconductor laser for signals, can be made unnecessary in the responder 350C. Therefore, consumption of the electric power obtained from the feed light 112 can be suppressed and the electric power can be supplied for other uses.

Fifth Embodiment

Figure 8:
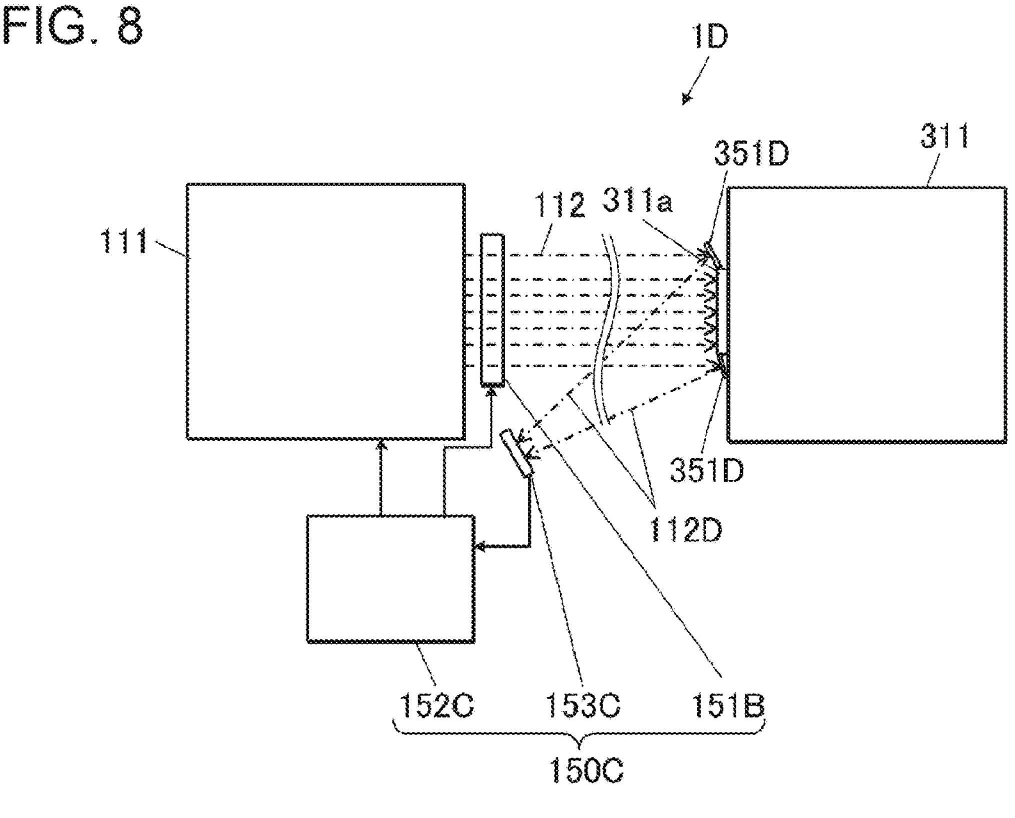
FIG. 8 is a configuration diagram of an optical power feeding system according to a fifth embodiment of the present disclosure.

FIG. 8 is a configuration diagram illustrating an optical power feeding system 1D according to a fifth embodiment that employs a configuration for optimizing the beam diameter of the feed light 112. In the fifth embodiment, only differences from the optical power feeding system 1C are described. The same components as those of the other embodiments already described are denoted by the same reference sings, and redundant description thereof is omitted.

The optical power feeding system 1D includes a reflector 351D as a responder around the light receiving surface 311*a* of the photoelectric conversion element 311 of the powered device. This is different from the optical power feeding system 1C.

The reflector 351D is provided at an outer edge of the light receiving surface 311*a* of the photoelectric conversion element 311 with almost no space to the outer edge of the light receiving surface 311*a*, so that the feed light 112 radiated to the area outside of the light receiving surface 311*a* is all reflected toward the response receiver 153C of the adjuster 150C.

In the optical power feeding system 1D, at the start of outputting of the feed light 112, the feed light 112 radiated to the area outside the light receiving surface 311*a* is reflected by the reflector 351D, and the reflected light is incident onto the response receiver 153C of the adjuster 150C as signal light 112D. Therefore, while the response receiver 153C detects the signal light 112D, the control device 152C can recognize that the beam diameter of the feed light 112 is larger than the appropriate value.

As the feed light 112 is gradually decreased, the feed light 112 fits within the light receiving surface 311*a* and is no longer reflected by the reflector 351D, and the response receiver 153C no longer detects the signal light 112D. Thus, the control device 152C can recognize that the beam diameter of the feed light 112 has reached the appropriate value. That is, interruption of the signal light 112D corresponds to the response indicating that the beam diameter of the feed light 112 has reached the appropriate value.

Upon acquiring this response, the control device 152C performs control for stopping decreasing the beam diameter of the feed light 112 and maintaining the beam diameter at the appropriate value.

The optical power feeding system 1D can optimize the beam diameter of the feed light 112 through the control described above, and can obtain a technical effect by the optimization of the beam diameter as in the optical power feeding system 1C.

In the optical power feeding system 1D, the configuration described above allows the responder to be formed of the reflector 351D alone. Thus, the configuration of the responder can be simplified, power consumption by the responder can be eliminated, consumption of electric power obtained from the feed light 112 can be markedly decreased, and more electric power can be supplied for other uses.

Sixth Embodiment

Figure 9:
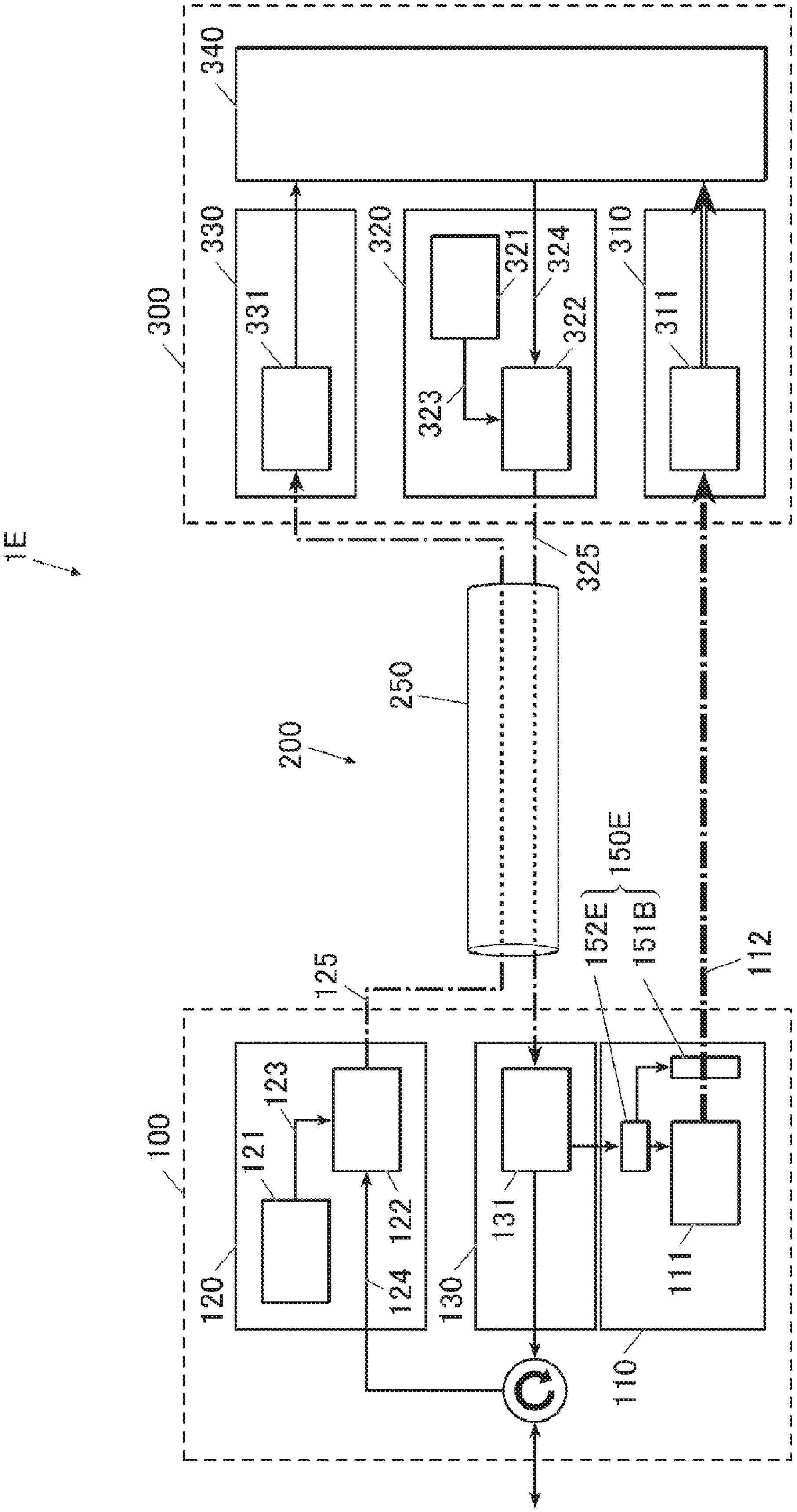
FIG. 9 is a configuration diagram of an optical power feeding system according to a sixth embodiment of the present disclosure.

FIG. 9 is a configuration diagram illustrating an optical power feeding system 1E according to a sixth embodiment that employs a configuration for optimizing the beam diameter of the feed light 112.

The optical power feeding system 1E of the sixth embodiment has a configuration in which an adjuster 150E is added to the first data communication apparatus 100 and the second data communication apparatus 300 has functions of a responder and a notifier in the optical power feeding system 1 of the second embodiment.

In the description below, the optical power feeding system 1E is described only in terms of differences from the optical power feeding system 1B.

The adjuster 150E includes the optical element 151B described above and a control device 152E that controls the optical element 151B and the semiconductor laser 111 for power feeding.

The control device 152E performs the same output control of the feed light 112 (FIG. 6) as that of the control device 152B of the optical power feeding system 1B described above.

In the optical power feeding system 1E, the data processing unit 340 of the second data communication apparatus 300 performs the processing performed by the responder (the processing of monitoring a change in electric power output by the photoelectric conversion element 311 from the start of reception the feed light 112, the processing of monitoring the abnormal light receiving state of the feed light 112, and the processing of determining whether the abnormal light receiving state is resolved that are performed along with the output control of the feed light 112).

The response indicating the appropriate state of the beam diameter, made by the responder, from the PD 310 of the second data communication apparatus 300, the notification of the abnormal light receiving state of the feed light 112 made by the notifier, and the notification of resume permission from a stopped state of the feed light 112 made by the notifier are made using the signal light 325 emitted by the transmitter 320 of the second data communication apparatus 300.

These signals are received by the receiver 130 of the first data communication apparatus 100 and input to the control device 152E.

Thus, the control device 152E can perform the same output control of the feed light 112 (FIG. 6) as that of the control device 152B described above.

With the configuration described above, the optical power feeding system 1E has the same technical effect as the optical power feeding system 1B.

Note that in the optical power feeding system 1E, since the transmitter 320 includes the modulator 322, the modulator 322 can transmit the signal light 325 to the adjuster 150E by including information for individually identifying each of the response indicating the appropriate state of the beam diameter, the notification of the abnormal light receiving state of the feed light 112, and the notification of resume permission from the stopped state of the feed light 112 in the signal light 325. This allows the adjuster 150E that has received the signal light 325 to identify which of the response indicating the appropriate state of the beam diameter, the notification of the abnormal light receiving state of the feed light 112, or the notification of resume permission from the stopped state of the feed light 112 the received signal light 325 indicates.

In the optical power feeding system 1B described above, the same signal light 112B is used for all of the response indicating the appropriate state of the beam diameter, the notification of the abnormal light receiving state, and the notification of restart permission. The control device 152B performs control corresponding to the response or notification depending on the processing step in which (timing at which) the signal light 112B is received without determining which of the response indicating the appropriate state of the beam diameter, the notification of the abnormal light receiving state, or the notification of resume permission the received signal light 112B is.

In contrast, when the modulator 322 of the optical power feeding system 1E allows the response indicating the appropriate state of the beam diameter, the notification of the abnormal light receiving state of the feed light 112, and the notification of resume permission from the stopped state of the feed light 112 to be individually identified, restriction that these response and notifications are transmitted only in predetermined processing steps (timings) is no longer applied. Thus, both the determination as to whether the beam diameter of the feed light 112 is appropriate and the determination as to whether the light receiving state is abnormal can be performed at any timing, and control for these determinations can be performed quickly.

The sixth embodiment described above exemplifies a configuration in which the signal light 125 and the signal light 325 are transmitted through the optical fiber cable 200. However, the signal light 125 and the signal light 325 may also be subjected to spatial transmission.

Others

The embodiments of the present disclosure have been described above. However, the present disclosure is not limited to the embodiments described above.

For example, instead of using spatial transmission over the entire transmission path of the feed light 112, a part of the transmission path may be formed by an optical fiber, and spatial transmission may be performed in the remaining part.

In this case, the optical element 151B is preferably provided at a position closest to the PSE 110 in the spatial transmission section.

For example, the transmitters 120 and 320 modulate the laser light according to a so-called external modulation method in which a modulator modulates laser light output by a semiconductor laser for signals. However, the laser light may be modulated according to a so-called direct modulation method in which the semiconductor laser for signals directly modulates and outputs the laser light.

An embodiment of the present disclosure is presented below. In an embodiment, (1) an optical power feeding system performs power feeding from power sourcing equipment to a powered device by spatial transmission of feed light.

The power sourcing equipment includes a light emitter configured to output the feed light, and an adjuster configured to variably adjust a beam diameter of the feed light.

The powered device includes a light receiver configured to convert the feed light that has been received into electric power, and a responder configured to make a response to the power sourcing equipment in accordance with whether the beam diameter of the feed light is appropriate.

The adjuster is configured to gradually decrease the beam diameter from a beam diameter at a start of outputting of the feed light, and stop decreasing the beam diameter, based on the response.

(2) In the optical power feeding system according to (1), the responder is configured to make the response, based on an output of the light receiver.

(3) The optical power feeding system according to (1) or (2) includes a notifier configured to make, to the power sourcing equipment, a notification of an abnormal light receiving state of the feed light in the light receiver, in which the power sourcing equipment is configured to stop outputting the feed light, in response to the notification.

(4) In the optical power feeding system according to any one of (1) to (3), the light emitter is a semiconductor laser in which a semiconductor material of a semiconductor region that exhibits a light-electricity conversion effect is a laser medium of a laser wavelength of 500 nm or shorter.

(5) In the optical power feeding system according to any one of (1) to (4), the light receiver is a photoelectric conversion element in which a semiconductor material of a semiconductor region that exhibits a light-electricity conversion effect is a laser medium of a laser wavelength of 500 nm or shorter.

(6) Power sourcing equipment that performs power feeding to a powered device by spatial transmission of feed light, includes a light emitter configured to output the feed light, and an adjuster configured to variably adjust a beam diameter of the feed light, in which the adjuster is configured to gradually decrease the beam diameter from a beam diameter at a start of outputting of the feed light, and stop decreasing the beam diameter, based on a response obtained in accordance with the beam diameter of the feed light.

(7) In the power sourcing equipment according to (6), the light emitter is a semiconductor laser in which a semiconductor material of a semiconductor region that exhibits a light-electricity conversion effect is a laser medium of a laser wavelength of 500 nm or shorter.

(8) A powered device to which power feeding is performed by spatial transmission of feed light from power sourcing equipment, includes a light receiver configured to convert the feed light that has been received into electric power, and a responder configured to make a response to the power sourcing equipment in accordance with whether a beam diameter of the feed light is appropriate, in which the responder is configured to make a response to the power sourcing equipment in accordance with the beam diameter of the feed light, in response to the power sourcing equipment gradually decreasing the beam diameter of the feed light from a beam diameter at a start of outputting.

(9) In the powered device according to (8), the responder is configured to make the response in accordance with the electric power converted from the feed light by the light receiver.

(10) In the powered device according to (8) or (9), the light receiver is a photoelectric conversion element in which a semiconductor material of a semiconductor region that exhibits a light-electricity conversion effect is a laser medium of a laser wavelength of 500 nm or shorter.

INDUSTRIAL APPLICABILITY

The present invention is industrially applicable to a powered device, power sourcing equipment, and an optical power feeding system that perform spatial transmission of feed light.

REFERENCE SIGNS

1, 1A to 1E optical power feeding system
100 first data communication apparatus
110, 110B, 110C power sourcing equipment
111 semiconductor laser for signals (light emitter)
112 feed light
112B, 112C, 112D signal light
120 transmitter
125 signal light
130 receiver
131 photodiode for signals

150B, 150C, 150E adjuster
151B optical element
152B, 152C, 152E control device
153B, 153C response receiver
200 optical fiber cable
250 optical fiber
300 second data communication apparatus
310, 310B, 310C powered device
311 photoelectric conversion element
311*a* light receiving surface
320 transmitter
321 semiconductor laser for signals
322 modulator
323 laser light
325 signal light
330 receiver
340 data processing unit
350B, 350C responder
351B semiconductor laser for signals
351C reflecting device
351D reflector (responder)
352B, 352C control device
h foreign matter
s beam diameter

The invention claimed is:

1. An optical power feeding system that performs power feeding from power sourcing equipment to a powered device by spatial transmission of feed light, the power sourcing equipment comprising:

a light emitter configured to output the feed light; and an adjuster configured to variably adjust a beam diameter of the feed light, the powered device comprising:

a light receiver configured to convert the feed light that has been received into electric power; and a responder configured to make a response to the power sourcing equipment in accordance with whether the beam diameter of the feed light is appropriate, wherein the adjuster is configured to gradually decrease the beam diameter from a beam diameter at a start of outputting of the feed light, and stop decreasing the beam diameter, based on the response.

2. The optical power feeding system according to claim 1, wherein the responder is configured to make the response, based on an output of the light receiver.

3. The optical power feeding system according to claim 1, comprising:

a notifier configured to make, to the power sourcing equipment, a notification of an abnormal light receiving state of the feed light in the light receiver, wherein the power sourcing equipment is configured to stop outputting the feed light, in response to the notification.

4. The optical power feeding system according to claim 1, wherein the light emitter is a semiconductor laser in which a semiconductor material of a semiconductor region that exhibits a light-electricity conversion effect is a laser medium of a laser wavelength of 500 nm or shorter.

5. The optical power feeding system according claim 1, wherein the light receiver is a photoelectric conversion element in which a semiconductor material of a semiconductor region that exhibits a light-electricity conversion effect is a laser medium of a laser wavelength of 500 nm or shorter.

6. Power sourcing equipment that performs power feeding to a powered device by spatial transmission of feed light, comprising:

a light emitter configured to output the feed light; and an adjuster configured to variably adjust a beam diameter of the feed light, wherein the adjuster is configured to gradually decrease the beam diameter from a beam diameter at a start of outputting of the feed light, and stop decreasing the beam diameter, based on a response obtained in accordance with the beam diameter of the feed light.

7. The power sourcing equipment according to claim 6, wherein the light emitter is a semiconductor laser in which a semiconductor material of a semiconductor region that exhibits a light-electricity conversion effect is a laser medium of a laser wavelength of 500 nm or shorter.

8. A powered device to which power feeding is performed by spatial transmission of feed light from power sourcing equipment, comprising:

a light receiver configured to convert the feed light that has been received into electric power; and a responder configured to make a response to the power sourcing equipment in accordance with whether a beam diameter of the feed light is appropriate, wherein the responder is configured to make a response to the power sourcing equipment in accordance with the beam diameter of the feed light, in response to the power sourcing equipment gradually decreasing the beam diameter of the feed light from a beam diameter at a start of outputting.

9. The powered device according to claim 8, wherein the responder is configured to make the response in accordance with the electric power converted from the feed light by the light receiver.

10. The powered device according to claim 8, wherein the light receiver is a photoelectric conversion element in which a semiconductor material of a semiconductor region that exhibits a light-electricity conversion effect is a laser medium of a laser wavelength of 500 nm or shorter.

* * * * *